(12) United States Patent
Melnychuk

(10) Patent No.: US 12,345,152 B2
(45) Date of Patent: Jul. 1, 2025

(54) POLYMER INSULATED THERMOCOUPLE BUNDLES

(71) Applicant: Precise Downhole Services Ltd., Nisku (CA)

(72) Inventor: Michael Melnychuk, Nisku (CA)

(73) Assignee: Precise Downhole Services Ltd., Nisku (CA)

( * ) Notice: Subject to any disclaimer, the term of this patent is extended or adjusted under 35 U.S.C. 154(b) by 995 days.

(21) Appl. No.: 16/750,803

(22) Filed: Jan. 23, 2020

(65) Prior Publication Data

US 2020/0240260 A1 Jul. 30, 2020

Related U.S. Application Data

(60) Provisional application No. 62/796,985, filed on Jan. 25, 2019.

(51) Int. Cl.
| | |
|---|---|
| *G01K 1/08* | (2021.01) |
| *E21B 17/00* | (2006.01) |
| *E21B 17/02* | (2006.01) |
| *E21B 47/07* | (2012.01) |
| *G01K 7/02* | (2021.01) |
| *H02G 1/08* | (2006.01) |
| *H02G 15/18* | (2006.01) |

(52) U.S. Cl.
CPC ............ *E21B 47/07* (2020.05); *E21B 17/003* (2013.01); *E21B 17/028* (2013.01); *G01K 1/08* (2013.01); *G01K 7/02* (2013.01); *H02G 1/08* (2013.01); *H02G 15/1806* (2013.01)

(58) Field of Classification Search
None
See application file for complete search history.

(56) References Cited

U.S. PATENT DOCUMENTS

| | | |
|---|---|---|
| 661,326 A | 11/1900 | Spates |
| 2,665,322 A | 1/1954 | Macdonald |
| 3,619,844 A | 11/1971 | Collins et al. |
| 3,716,417 A | 2/1973 | Evans |
| 4,385,197 A | 5/1983 | Schwagerman |
| 4,408,088 A | 10/1983 | Foote |
| 4,801,501 A | 1/1989 | Harlow |

(Continued)

FOREIGN PATENT DOCUMENTS

| | | |
|---|---|---|
| CA | 2695608 | 9/2011 |
| CA | 3031478 | 7/2020 |

(Continued)

OTHER PUBLICATIONS

Penny et al., A New Approach to Thermal Profiling in High Temperature Reservoirs Based on Advanced, Polymeric Insulated Thermocouples to Increase Measurement Point Density, paper, Nov. 23-25, 2015, 1-17, Society of Petroleum Engineers, Canada.

*Primary Examiner* — Erica S Lin
(74) *Attorney, Agent, or Firm* — Bennett Jones LLP

(57) ABSTRACT

A thermocouple cable is formed from a tubing and a plurality of thermocouple conductors bundled within the tubing, wherein each thermocouple conductor forms a junction with a shared thermocouple conductor to form a thermocouple junction, and each thermocouple junction is attached to a support cable in a thermocouple bundle. The cable is formed by pulling the thermocouple bundle into the tubing.

15 Claims, 6 Drawing Sheets

(56)  References Cited

U.S. PATENT DOCUMENTS

| | | | |
|---|---|---|---|
| 5,121,994 | A | 6/1992 | Molitoris |
| 5,220,130 | A | 6/1993 | Walters |
| 5,457,841 | A | 10/1995 | Minton |
| 5,699,996 | A | 12/1997 | Boyle et al. |
| 6,180,889 | B1 | 1/2001 | Bul |
| 6,613,261 | B2 | 9/2003 | Knapp |
| 6,780,360 | B2 | 8/2004 | Lange et al. |
| 7,290,601 | B2 | 11/2007 | Chalifoux et al. |
| 7,714,231 | B2 | 5/2010 | Varkey et al. |
| 8,329,437 | B1 * | 12/2012 | Ayliffe ............... G01N 15/1056 |
| | | | 435/173.9 |
| 8,353,347 | B2 | 1/2013 | Mason |
| 8,530,746 | B2 | 9/2013 | Zheng et al. |
| 2004/0238023 | A1 | 12/2004 | Richetto et al. |
| 2011/0224907 | A1 | 9/2011 | Chalifoux |
| 2014/0060606 | A1 | 3/2014 | Smith et al. |
| 2014/0196930 | A1 | 7/2014 | De Bree et al. |
| 2018/0289925 | A1 * | 10/2018 | Palmer .............. A61M 25/0045 |
| 2021/0164847 | A1 | 6/2021 | Melnychuk |

FOREIGN PATENT DOCUMENTS

| | | |
|---|---|---|
| EP | 0681353 | 11/1995 |
| EP | 1324090 | 7/2003 |
| GB | 874650 | 8/1961 |

\* cited by examiner

POLYMER INSULATED THERMOCOUPLE BUNDLES

FIELD OF THE INVENTION

The present invention relates to thermocouples and a thermocouple cable, particularly those configured to operate in high-temperature environments.

BACKGROUND

Thermal recovery schemes are becoming increasingly common as conventional oil supplies decrease. Accordingly, unconventional schemes presenting downhole temperatures above 80° but typically below 350° C. are increasingly common. High quality temperature and pressure measurements to characterize the downhole environment are important in such schemes.

The ability of thermocouples to measure temperature is based on the observation that when two different electrically conductive materials are joined together at one end, and the temperature of the joined end is different than that of the open end, a millivoltage differential is produced. That differential can be measured and used to produce a temperature reading. Every conductor for the entire length of the thermocouple, between the joined end and the open end must be insulated.

Mineral insulated thermocouples are widely used, but typically provide a limited number of discrete temperature sensing points. Also, mineral insulation is hygroscopic, and moisture accumulation can affect insulating capability over time.

While dielectric polymers are known and widely used in the oil and gas industry, they suffer from disadvantages which make them unsuited for thermal applications. Polyimides often fail due to hydrolysis. Fluorothermoplastic polymers are known for their chemical resiliency, however will melt or soften and flow at the higher temperatures experienced in thermal oil recovery.

Long thermocouple cables having a large number of thermocouple junctions are known. These cables are capable of measuring temperature at multiple points along the cable. The cable comprises a large number of thermocouple conductors having spaced junctions with a shared conductor, installed in a capillary tubing. However, conventional methods of forming such long thermocouple cables result in a large number of failed connections, due at least in part to wire twisting, insulation damage and breakages.

Therefore, there is a need in the art for a thermocouple cable which may mitigate the disadvantages of the prior art, together with methods of making such cables.

SUMMARY OF THE INVENTION

In one aspect, the invention comprises a thermocouple cable comprising a tubing and a plurality of thermocouple conductors bundled within the tubing, wherein each thermocouple conductor forms a junction with a shared conductor wire to form a thermocouple junction, and each thermocouple junction is attached to a support cable. Preferably, the support cable runs at least the length between all thermocouple junctions and is attached to each thermocouple junction. Optionally, the tubing may be filled with a high-temperature matrix which embeds the bundle of thermocouple conductor.

In another aspect, the invention may comprise method of manufacturing a thermocouple cable, comprising the steps of:

(a) inserting a pull line into a hot end of a tubing until it emerges from a cold end of the tubing;

(b) forming a first thermocouple junction comprising a first thermocouple conductor connected to a shared thermocouple conductor, wherein the first thermocouple junction is attached to a support cable in a first thermocouple bundle;

(c) attaching the support cable to the pull line and pulling the first thermocouple bundle into the tubing using the pull line;

(d) forming a second thermocouple junction comprising a second thermocouple conductor connected to a shared thermocouple conductor, wherein the second thermocouple junction is attached to the support cable in a second thermocouple bundle;

(c) attaching the support cable to the pull line and pulling the second thermocouple bundle into the tubing using the pull line;

(e) pulling the first thermocouple bundle through to the hot end of the tubing; and (f) optionally filling the tubing with a high temperature matrix.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION

Figure 2:
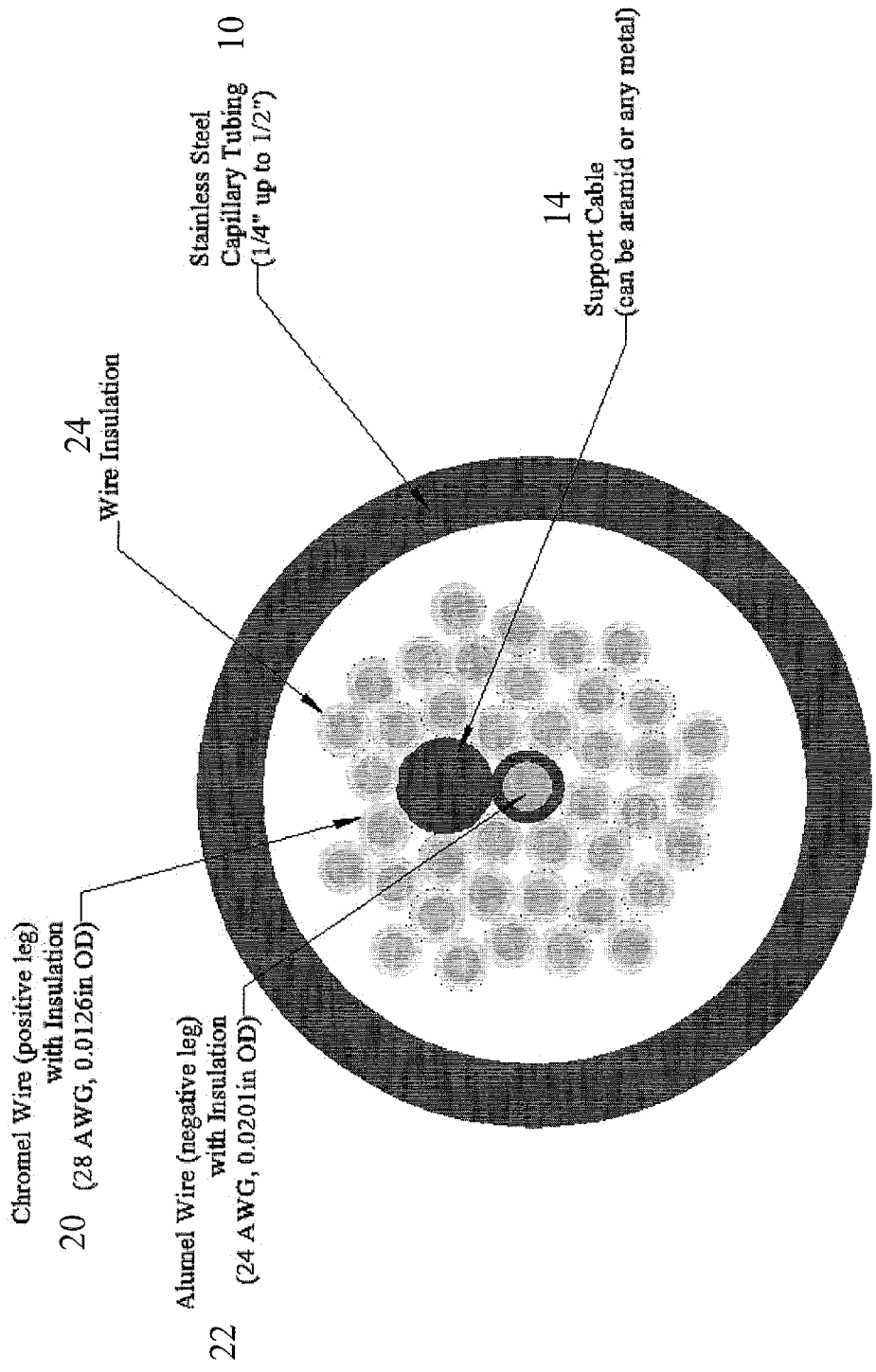
FIG. 2 shows a cross-sectional view of the cable of FIG. 1.

In one aspect of the invention, the invention comprises a thermocouple cable comprising a tubing (10) and a plurality of thermocouple conductors (20) bundled within the tubing, wherein each thermocouple conductor forms a junction (30) with a shared thermocouple conductor (22), and each thermocouple junction is attached to a backbone support cable (14). Optionally, the tubing may be filled with a high-temperature matrix which embeds the bundle of thermocouple conductors. A cross-section of an assembled cable is shown in FIG. 2. As may be seen, a large number of thermocouple conductors can be housed in the tubing, which may be any size, such as in the range of between ¼" and ½" tubing.

As used herein, the "hot end" is the end of the thermocouple cable which is intended to be installed downhole, whereas the "cold end" is the end which remains at the surface and is connected to a data collection system which reads the thermocouple readings. The surface data collection system is not part of this invention. The hot and cold ends are identified to designate the orientation of the cable, and not to limit any temperature limitations at either end, or relative to one another.

As used herein, "high temperature materials" are those which do not experience significant degradation in their relevant properties at temperatures above about 200° C., more preferably 250° C., and most preferably 300° C. For example, high temperature materials may soften at elevated temperatures, but still maintain sufficient solidity to function as intended.

Figure 1:
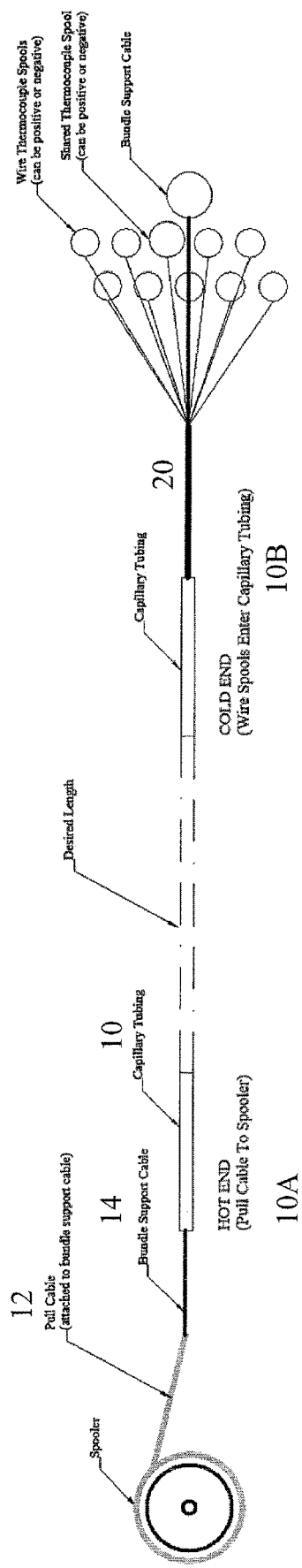
FIG. 1 shows a schematic representation of a thermocouple cable assembled in accordance with one example of the present invention.

The thermocouple cable may be formed by first providing the required or desired length of capillary tubing (10), which may be in the hundreds or thousands or meters. A pull line (12), such as a stainless steel wire (or equivalent), is blown in from the hot end (10A) of the cable using an insertion pig (not shown). The pull line (12) does not form part of the final product, but is used in to assemble the final product. When the pull line (12) emerges from the cold end (10B), it is connected to a support cable (14) which will eventually run substantially the entire length of the tubing (10). FIG. 1 shows the cable near completion of its assembly, after the support cable and the plurality of thermocouple junctions have been pulled through the tubing.

Preferably, the support cable (14) comprises a suitable high tensile and high temperature material, which may comprise high-strength steel wire or an aramid fiber cable, such as Kevlar™ or Technora™. It is preferred that the support cable (14) resist significant stretching, particularly at elevated temperatures, and have test strength of at least about 200 lbs, and preferably higher. However, if the thermocouple cable is not intended to be used in high-temperature applications (greater than about 200° C.), then high-temperature materials need not necessarily be used.

In an alternative embodiment, the support cable (14) may be replaced by a sufficiently strong shared conductor wire (22), which would serve the dual purpose of providing a physical backbone to the assembly, and be an electrical conductor.

Figure 3:
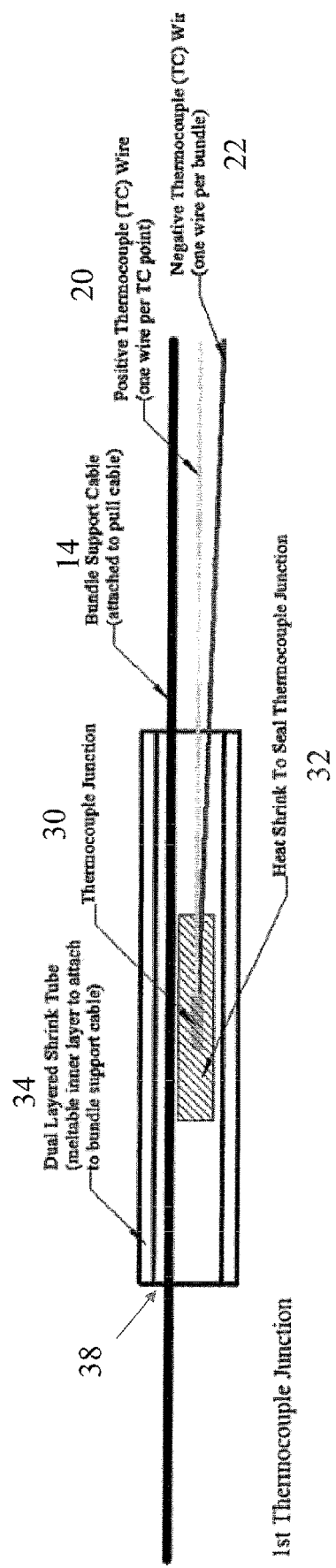
FIG. 3 is a schematic view of the formation of the first thermocouple (TC) point.
Figure 4:
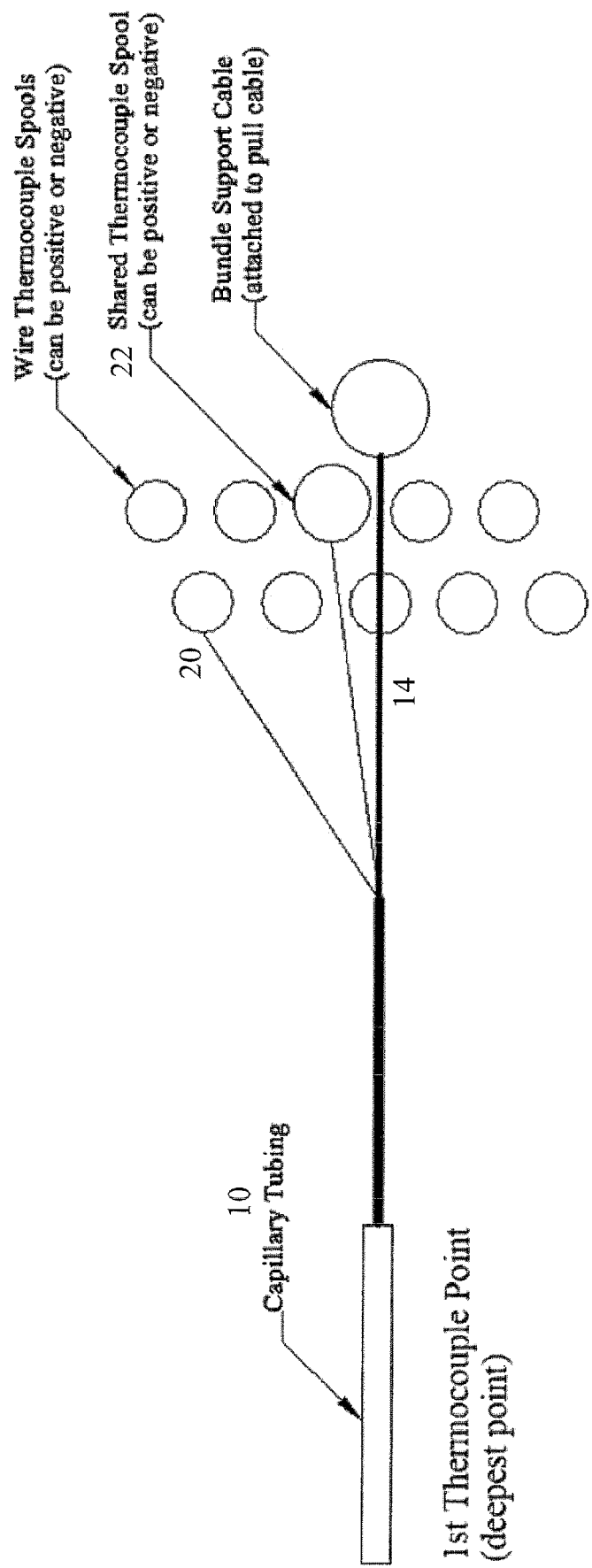
FIG. 4 is a schematic view of the wire spools used to form the first thermocouple junction.

As shown in FIG. 3, a first thermocouple conductor (20) is connected to the shared conductor wire (22) to make the first thermocouple (TC) junction (30), using any conventional method, such as a twisting and solder junction connection as is well known in the art. A heat shrink cover (32) may be placed over the junction to seal it from moisture, which cover is preferably resistant to high-temperatures.

The thermocouple conductors, including the shared conductor wire, must be electrically insulated for the length of the cable. In preferred embodiments, the conductors may be insulated with a polymer (24) which is dielectric, preferably non-hygroscopic, and preferably has a melting point above about 200°, more preferably 250° and most preferably 300° C. One particularly suitable material may comprise ECA 3000™ fluoropolymer resin (DuPont™). Perfluoroalkoxy (PFA) alkane copolymers of tetrafluoroethylene (TFE) and perfluoroethers may be suitable. PFAs also have a high melting point (up to 315° C.) but, unlike PTFE, may be melt-processed or melt-extrudable. These conductors may be used at temperatures up to about 350° C. if the insulating polymer is itself coated with a fiberglass jacket (not shown). Although the polymer insulation may soften significantly at that temperature, the fiberglass coating will ensure the structural integrity of the insulating layer.

The first TC junction (30) is then secured to the support cable (14) in a suitable manner, such as by another heat shrink sleeve (34), which provides a secure physical connection between the TC junction (30) and the support cable (14). Preferably, the heat shrink sleeve (34) is a dual layer sleeve, which comprises a solid outer layer (36) and a meltable inner layer (38). Preferably, the heat shrink sleeve comprises fluoropolymers. In one embodiment, the dual layer sleeve comprises an outer layer (36) which comprises Teflon™ (polytetrafluoroethylene or PTFE) which has a melting point of 327° C., while the inner layer (38) may comprise perfluoroalkoxy (PFA) alkane copolymers of tetrafluoroethylene (TFE) and perfluoroethers. PFAs also have a high melting point (up to 315° C.) but, unlike PTFE, may be melt-processed. An alternative material for the inner layer may comprise fluorinated ethylene propylene (FEP) which is a copolymer of hexafluoropropylene and TFE, and which has a melting point of 260° C.

Figure 5:
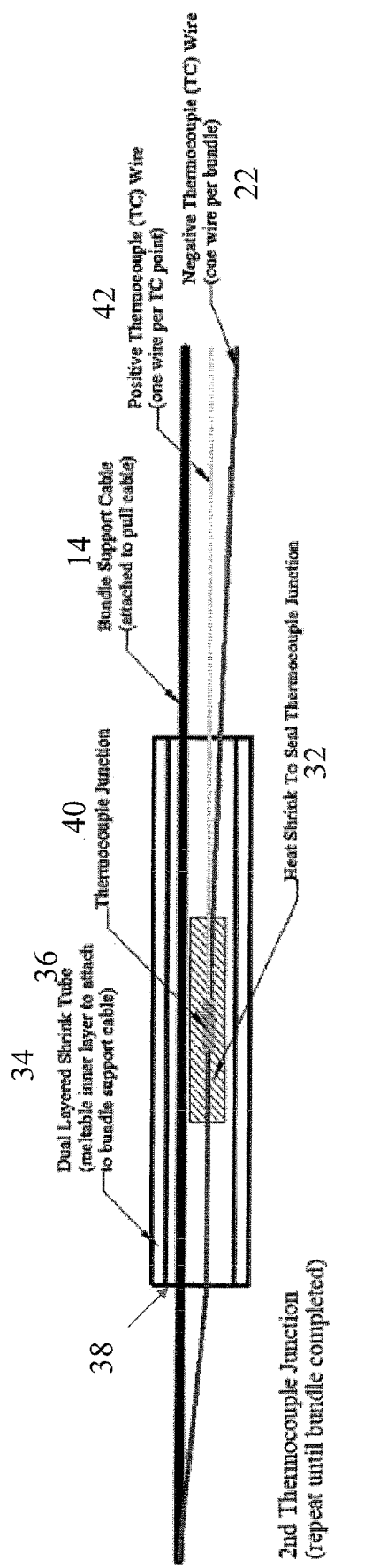
FIG. 5 is a schematic view of the formation of the second and subsequent thermocouple (TC) points.

The first TC junction (30) and support cable (14) is then pulled into the tubing (10) until the second TC junction interval which may be, for example, 1 meter to 10 meters. As shown in FIG. 5, a second thermocouple conductor (42) is connected to the shared thermocouple conductor (22) to form a second TC junction (40), and secured to the support cable (14) by a heat shrink sleeve (34), in like manner to the first TC junction (30).

Figure 6:
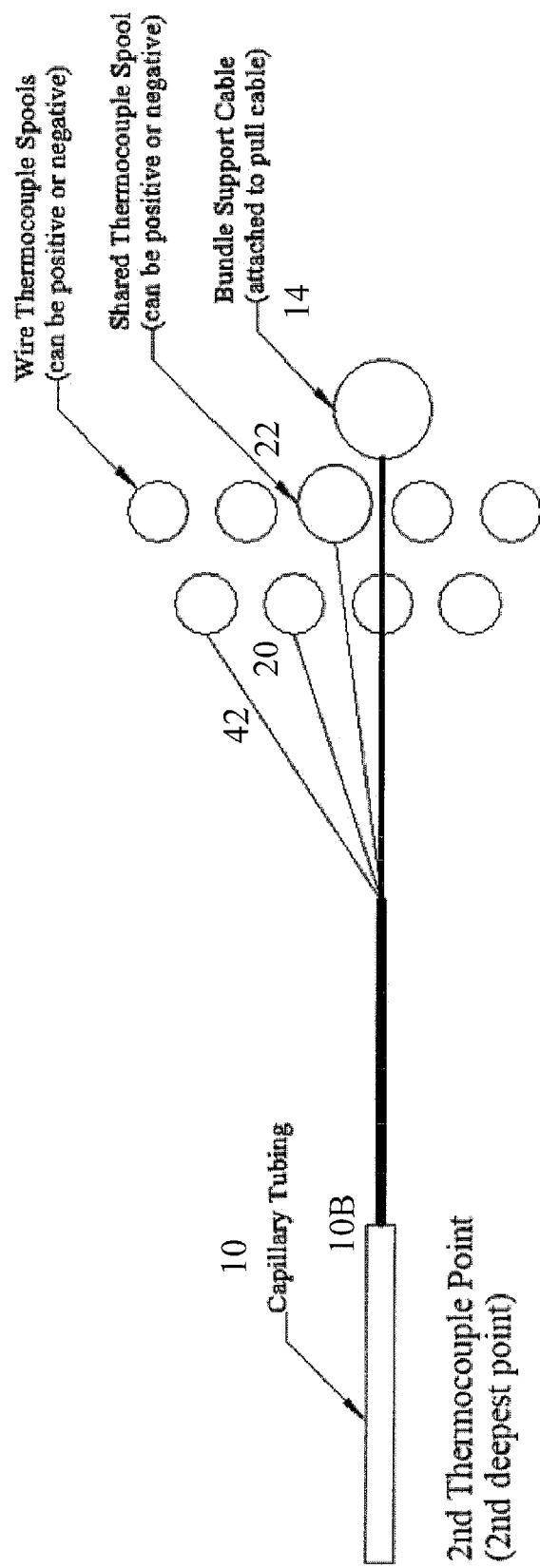
FIG. 6 is a schematic view of the wire spools used to form the second thermocouple junction.

At this point, the bundle consists of the support cable, the shared thermocouple conductor, and the first and second thermocouple conductors, as shown in FIG. 6. The process is then repeated for as many TC junctions as are desired, which may be dozens or even hundreds.

Once all of the TC junctions are formed, the support cable (14) may be cut (at the cold end) and the thermocouple bundles may be pulled all the way such that the first TC junction (30) is at least adjacent the hot end. The support cable (14) is buried in the tubing and connects all the TC junctions, but is not required between the last TC junction and the cold end.

The support cable (14) thus forms the backbone of the thermocouple string as it is securely connected to all of the thermocouple conductors. As the TC junctions are pulled into the tubing one-by-one, it is not necessary to make a large number of points from the beginning. The thermocouple bundle is kept in constant tension as the support cable (14) is attached to each wire and prevents any wire from turning around on itself due to any twisting effects.

In one embodiment, each thermocouple conductor wire may be colour coded to ensure correct identification and depth verification.

Conventional mineral insulated thermocouples require multiple cables to be banded or crimped together. This results in void spaces and non-uniform profile which prevents any BOP assembly from creating a seal during installation. The thermocouple cable of the present invention presents a single uniform outside diameter (the tubing) while still including a large number of TC junctions. This permits effective sealing and well control during installation with BOP equipment.

Definitions and Interpretation

The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. Embodiments were chosen and described in order to best explain the principles of the invention and the practical application, and to enable others of ordinary skill in the art to understand the invention for various embodiments with various modifications as are suited to the particular use contemplated.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such aspect, feature, structure, or characteristic with other embodiments, whether or not explicitly described. In other words, any element or feature may be combined with any other element or feature in different embodiments, unless there is an obvious or inherent incompatibility between the two, or it is specifically excluded.

What is claimed is:

1. A thermocouple cable comprising a tubing and a plurality of thermocouple conductors bundled within the tubing, wherein each thermocouple conductor forms a separate junction with a shared thermocouple conductor to form a corresponding thermocouple junction, and forming a plurality of thermocouple junctions spaced apart from each other, wherein each thermocouple junction of the plurality thermocouple junctions, includes the shared thermocouple conductor, and each thermocouple junction is attached to a common support cable inside a thermocouple bundle and the support cable is either the same or separate from the shared thermocouple conductor.

2. The cable of claim 1 wherein the support cable runs at least the length between all thermocouple junctions and is attached to each junction.

3. The cable of claim 1 wherein the support cable comprises aramid fibers.

4. The cable of claim 1, wherein the each thermocouple junction is encased in a moisture resistant sleeve.

5. The cable of claim 1 wherein the each thermocouple bundle comprises a multilayer heat shrink sleeve.

6. The cable of claim 5 wherein one or all of the heat shrink sleeve layers comprises a fluoropolymer.

7. The cable of claim 6 wherein an outer layer comprise polytetrafluoroethylene (PTFE) and an inner layer comprises perfluoroalkoxy (PFA) copolymer or fluorinated ethylene propylene (FEP) copolymer.

8. The cable of claim 1 wherein each thermocouple conductor is insulated with a dielectric polymer a melting point above about 200° C.

9. The cable of claim 1 wherein the tubing is filled with a high-temperature matrix which embeds the entire bundle of thermocouple conductors, thermocouple points and thermocouple bundles.

10. The cable of claim 1 wherein the shared thermocouple conductor forms the support cable.

11. The cable of claim 8, wherein the dielectric polymer melting point is greater than 250° C.

12. The cable of claim 11 wherein the dielectric polymer melting point is greater than 300° C.

13. The cable of claim 1, wherein the support cable is separate from the shared thermocouple conductor.

14. A thermocouple cable comprising a tubing and a plurality of thermocouple conductors bundled within the tubing, wherein each thermocouple conductor forms a separate junction with a shared thermocouple conductor to form a corresponding thermocouple junction, and forming a plurality of thermocouple junctions spaced apart from each other, wherein each thermocouple function, of the plurality of thermocouple functions, includes the shared thermocouple conductor, and the shared thermocouple cable forms a support cable.

15. The cable of claim 14, wherein the shared thermocouple cable serves a dual purpose of providing a physical backbone in the thermocouple cable, and acting as an electrical conductor.

* * * * *